Patented Nov. 24, 1936

2,062,255

UNITED STATES PATENT OFFICE 2,062,255

PIGMENT MANUFACTURE

Arthur Minard Brooks and Harold Robert Rafton, Andover, Mass., assignors to Raffold Process Corporation, a corporation of Massachusetts No Drawing. Application August 12, 1932,
Serial No. 628,616

34 Claims. (Cl. 134—58)

This invention relates to the manufacture of pigments in finely divided form.

The principal object of this invention is to produce a pigment in finely divided form conjointly with the production of caustic alkali in the causticizing process.

An important object of the invention is to produce a finely divided pigment in the causticizing operation by controlling the temperature of the reaction, and by employing preslaked lime.

A further object of the invention is the production of a finely divided pigment in the causticizing operation by controlling the conditions of agitation.

A further object of the invention is the production in soda or sulphate pulp mills of a finely divided pigment, useful for filling or coating paper.

Other objects and advantages of the invention will become apparent during the course of the following description.

As indicated above, the present invention constitutes a modification of and an improvement over the causticizing process as heretofore practiced. In order that the material differences between this invention and the prior art may be more quickly appreciated, there is outlined below a description of current causticizing practice, as conducted in soda and sulphate pulp mills, alkali plants, soap works, and the like. For purposes of illustration sodium carbonate ($Na_2CO_3$) is chosen as an example of a causticizable salt, and lime, i. e. calcium oxide ($CaO$), as an example of a causticizing agent. The sodium carbonate may consist in whole or in part of soda reclaimed from spent process liquors or of commercial soda ash or a solution thereof. The lime is slaked in the sodium carbonate solution and the batch is boiled up for a sufficient length of time with or without mechanical agitation. This reaction produces a sludge consisting of coarse-grained calcium carbonate with accompanying impurities, such as free lime, and a solution of sodium hydroxide which usually contains a small percentage of unconverted sodium carbonate. Boiling and mechanical agitation, if used, are then stopped and the sludge allowed to settle. Being of coarse particle size the sludge settles rapidly which is highly desired since the supernatant causticized liquor may then be separated easily by decantation. The sludge, or lime mud as it is also called, may then be subjected to successive boilings and decantations to recover the soda salts associated therewith. It is then discharged to waste, or in some cases where cheap fuel is available and/or local regulations prohibit stream pollution, it may be reburned to lime for reuse as above. While the operation may be conducted as a batch, step, or continuous process, employing countercurrent methods if desired, the essential steps involved are of the same nature as outlined above.

If desired, the lime mud may be prepared for use in the industrial arts, as for example by neutralizing any free alkali or free lime present with carbon dioxide gas or with other acidic material, drying, grinding, and the like, using any or all of these procedures in any desired sequence. However, only a small proportion of the lime mud produced finds use in industry, and the disposal of the enormous quantities of lime mud regularly made constitutes an economic problem of major importance.

The present invention provides a very inexpensive method of preparing directly in the causticizing operation a pigment of such a quality that it will find wide usage and thereby solve in a large measure the problem of lime mud utilization. Instead of directing attention only to the production of the caustic alkali, the conditions of the causticization according to the present invention are so adjusted that, without detriment to the production of caustic alkali, the precipitate or mud produced possesses characteristics of great technical value.

Briefly described, the present invention involves subjecting sodium carbonate to the action of previously slaked lime in an aqueous medium at a temperature of or below 75° C., preferably under conditions of vigorous agitation. The following steps may conveniently be taken in carrying out the invention: Slake the lime thoroughly in water, if necessary adjust the temperature of the slaked lime to the desired point, mix the slaked lime with sodium carbonate which may conveniently be in solution at the desired temperature, agitate the mix at the desired temperature or in the desired temperature range, separate the liquor from the precipitate as by filtration, and wash the precipitate to separate soda salts more or less completely as desired. If for any reason it be desired to have the precipitate retain its free lime content, if any, or to have it converted by any method other than the use of sodium carbonate, as for instance by acid, then the soda salts may be removed as completely as feasible. However, if sodium carbonate is to be used for substantially removing any free lime present, then the precipitate is preferably treated with sodium carbonate in an aqueous medium, the liquor separated and the precipitate washed. In order to remove any particles of oversize which may be present, any suitable procedure may be employed, such as screening which may be carried out at any time as in the presence of liquor or water. The precipitate may be used directly or dried before use or otherwise handled or treated in any known manner. The causticized soda liquors may be combined if desired for any specific purpose, for example for the cooking of wood by the soda pulp process or the production of caustic soda for the chemical market.

As will be apparent the several steps taken in carrying out the invention are susceptible to variation in their practice and these steps, and the preferred methods of carrying them out, together with variables influencing them will be discussed fully below. However, in order that this invention may be fully understood there is given first a concrete illustrative example of one formula and procedure which is satisfactory for the carrying out of the invention in practice, but which is to be considered in no way as limiting.

2700 lbs. of lime are slaked in 1550 gallons of boiling water in an upright cylindrical tank 9 feet in diameter and 9 feet high, equipped with a strong agitating device comprising a horizontal arm attached to a vertical shaft, the arm being located about 2½ feet above the tank bottom and being equipped with flexible steel fingers whereby the lime may be thoroughly stirred during slaking and may finally exist in the form of a thick paste or mud. The thoroughly slaked mass is then allowed to cool down to a temperature of approximately 50° C. There is then added in solution 4800 lbs. of sodium carbonate, at a temperature of 50° C. or lower and the final volume of the batch is adjusted if necessary to approximately 3800 gallons with the addition of water, or weak liquor from previous causticizing batches if available. The mix is then subjected to agitation which is preferably of a very vigorous type. If the slaking tank agitator is not equipped for change in speed of agitation, the batch may, after a preliminary mixing of a few moments, be transferred directly to a tank equipped with a device for vigorous mixing, such as a high speed agitator or the like, and the mixing continued from 2 to 3 hours. The batch is then heated to boiling, allowed to run at about that temperature for about ½ hour, filtered on a filter press to separate the liquor from the mud, and the mud further treated with approximately 800 lbs. of sodium carbonate in solution at a temperature at or near boiling for about an hour, the total volume of the mix being 3800 gallons, and then a second filtration made, with thorough washing of the mud. The liquors from the first and second filtration may be so combined as to yield a liquor of approximately 90 per cent. causticity at about 11 to 11½° Bé. which is suitable for use in cooking wood by the soda pulp process. The mud produced will be found to be of very fine grain, and after passing through a suitable screen to remove oversize may be used, for example, as a filler for paper and also, preferably after suitably dewatering, as a coating for paper.

The invention disclosed herein is based on the discovery that when employing previously slaked lime in the causticizing reaction the temperature of causticization influences profoundly the particle size of the resulting precipitate so that by properly controlling the temperature below a certain critical point a fine particle size precipitate may be produced. When lime is slaked directly in the sodium carbonate solution as in the usual causticization, the particle size of the lime sludge produced varies slightly with temperature, under certain conditions being even larger at lower temperatures than at higher, but any variations are such as to be of no substantial commercial importance from the standpoint of the production of fine particle size of pigment. The effect of temperature on particle size when previously slaked lime is used, however, has been found to be of a different order of magnitude, i. e. very much greater, and constitutes a difference which has proved to be of great technical importance.

The temperature range employed for conducting the causticizing operation in accordance with the present invention is that from 75° C. down to room temperature or lower, even down to the freezing point of the mix. As is well recognized, limes vary greatly one from another, but in spite of these variations it has been found that most limes so far tested show a markedly different particle size of the lime mud producible therefrom when employed in the causticizing reaction (with previous slaking) at a temperature of 75° C. or below, from what they show at any temperature ranging from above 75° C. to that of boiling. Some limes, however, have been tested which exhibit the dividing point between coarse and fine grain precipitates produced at a temperature of 70° C. Thus, the upper point in temperature which may be used in the present invention is seen to vary somewhat with the lime employed, but considering the wide variation in limes so far tested, this upper temperature point, or critical temperature, seems to be substantially definite.

In determining this point, no attempt was made to make successive tests closer than at 5° intervals; tests were made e. g. at temperatures from boiling to room temperature and below, so that when the statement is made herein relative to the critical temperature at which a fine particle size precipitate is produced, it means that the test conducted at the next 5° interval above that point did not show fine particle size whereas that particular test did show fine particle size.

The dividing line between fine and coarse grain precipitates is, as stated, quite sharp but the fineness of the precipitate seems to be enhanced in most cases at a reaction temperature of 60° C., and to be even finer at a reaction temperature of approximately 50° C. Below that point in some cases the precipitate produced seems to be somewhat finer than that produced at 50° C. and in some cases not, whereas with certain limes an intermediate point between 50° C. and very low temperatures appears to be the temperature of maximum fineness. Thus, there seems to be no general statement that can be made covering the tendencies of all the limes tested below 50° C., but the statement can be made that at reaction temperatures of 75° C. or below with most limes and of 70° C. or below with others, the particle size of the precipitates produced is distinctly finer than that of those produced above those temperatures, that at 60° C. the particle size is finer than at 70° C., and that in most cases the particle size at 50° C. or below represents the smallest that can be produced by adjustment of temperature. The reaction my be carried out, not higher than the critical temperature, at one definite temperature or within a temperature range. One convenient method is to start the reaction at 50° C. and then allow the mix to cool to room temperature as the reaction progresses. Other suitable methods are feasible, for example, such as those mentioned elsewhere herein. A peculiar thickening or gelling has been found to occur at times at lower temperature ranges and a discussion of this and methods of avoidance thereof, if desired, is given later.

Relative to time requirements, it has been found that at 50° C., using concentrations which produce liquors suitable for wood cooking, suitable causticity may be reached in approximately 4 to 8 hours, and it may be stated that the time required for carrying out the reaction is in general greater the lower the temperature. However, although in certain cases it may be desired to maintain the specified temperature or temperature range throughout the mixing or mixings, the important point is the conducting of a substantial if not the major part of the reaction initially at the temperature specified and thus after this has been accomplished, where the time factor is important, the temperature may be subsequently raised even to boiling to bring about the conversion of the sodium carbonate much more speedily, and permit a more speedy filtration due to decrease of viscosity of the solution with rise in temperature. Thus, a preliminary mix at the desired temperature for 2 to 3 hours, followed by boiling, reduces the time required without, in most cases, causing any great deterioration in the quality of the material produced. As conditions vary in different plants and with different limes, however, the quality of the material when subsequent high temperatures are used should be checked against batches run wholly within the specified temperature range to be sure that the danger point in such practice has not been reached. The time required may be shortened in other ways also, such as by increasing the degree of agitation, increasing the proportion of sodium carbonate to lime and, if permissible, from the standpoint of ultimate use of liquors, by decreasing the concentration of the mix.

Relative to agitation, this has been found to have a very important bearing in certain cases on the quality of the precipitate produced. The preferred method of carrying out the invention is to perform the causticizing reaction under conditions of vigorous agitation.

Where the lime is slaked to a thick slurry with the agitator described above, such agitator, necessarily running at slow speed, gives a degree of agitation in the tank, after the mix has been made up with the sodium carbonate solution, which may not be adequate. Providing there is no way of increasing the speed of such an agitator, it is preferable after the few minutes required to preliminarily incorporate the slaked lime slurry with the solution, to transfer the mix to a second tank equipped for vigorous agitation so that the reaction may be conducted under conditions of vigorous agitation. There are a number of well known agitating devices on the market which give satisfactory results, and although it is not the intention of limiting the carrying out of the reaction to any one type of apparatus, it can be stated that an efficient type of agitator for the purpose is a high speed propeller operating in a draft tube centrally located in a mixing tank, to insure vigorous agitation accompanied by efficient circulation. Agitation with air when properly applied may be used if desired, particularly as auxiliary agitation.

Regarding lime, the present invention may be carried out successfully with limes made from limestones from various geological formations as well as with "reburned" lime such as from lime sludge, and with limes of various types, as lump and granular limes, and also with those produced in various ways, as in upright kilns, rotary kilns, sintering machines, and the like. In general, the lime used should preferably possess the following properties: it should slake well, be of good white color, be as free as feasible from unburned cores, and have a high calcium oxide and a low silica content.

As is known, the use of slaked lime containing magnesia, e. g. dolomitic lime, in the causticizing process, results in a fine grain precipitate, in contradistinction to the coarse grain precipitate of ordinary lime mud produced when high calcium lime is employed in the ordinary causticizing process. It has been found, however, that by the control of the temperature at which the causticizing reaction employing lime containing magnesia is carried out, that the grain of the precipitate may be rendered even finer and, thus, by carrying out the reaction in a lower temperature range, extremely fine grain precipitates may be produced. This effect is analogous to the effect of using lower temperatures in the causticizing reaction with preslaked calcium lime. However, while the effects are similar, the claims reciting "lime" in the present specification are to be construed as being limited to calcium lime, or lime containing a commercially unimportant proportion of magnesia.

In this connection, cross reference is hereby made to our continuing copending application, Serial No. 684,604, filed Aug. 10, 1933, wherein claims are presented reading specifically to lime containing magnesia.

While the lime may be slaked in any desired amount of water, it is preferable to slake it in such an amount as to yield a thick mud or slurry. Although not the preferred method, the slaking may be conducted in liquors containing a relatively small amount of sodium carbonate, as for example in weak wash liquors from the process, whereby a somewhat inferior product is obtained. However, the lime must not be slaked in the main body of the liquor containing the sodium carbonate to be causticized, as under such conditions only relatively coarse grain precipitates are produced regardless of reaction temperature. The slaking water may be cold, boiling or at any intermediate temperature. In general, however, the best results are more easily obtainable using lump quick lime and slaking in boiling water. While limes vary considerably in the amount of slaking water necessary to convert them into a thick slurry, nevertheless the proportions given in the illustrative example above will be found to be about the average required with lime of good grade. Sufficient time should be allowed for complete slaking to be effected. The slaking reaction is usually very rapid, but it is better to allow at least ½ hour to an hour to be sure of getting good results, and with certain limes even longer slaking times have been found advantageous.

As has been indicated above, the final precipitated product may be processed, for example to free it from oversize, by any method desired such as flotation, sieving, grinding or the like. It is also apparent that if desired the lime used in the reaction may be subjected to similar processing, preferably after the slaking has been completed. Such operation may be conducted on the lime in addition to that conducted on the final product, or in lieu thereof, but it is usually preferable to conduct it on the final product. The reason for this is that in order to sieve slaked lime satisfactorily it should be in relatively dilute suspension, and when concentrated caustic liquor is desired to be produced, such dilute lime suspension ordinarily requires concentration prior to its use in the causticizing reaction, such as by filtering and the like, and as this introduces an additional step, it is usually more desirable as stated above to confine such refining operation to the calcium carbonate produced rather than performing it in connection with the lime used.

One type of previously slaked lime is what is known in the trade as "hydrated lime". Such lime is made by reacting upon lime with water in sufficient quantity so that the final product while containing substantially no calcium oxide will nevertheless be substantially dry to the touch. Hydrated limes are usually made in some type of commercial hydrator, usually continuous, by feeding in lime and the desired quantity of water, whereupon hydrated lime is produced which may be ground, sieved, or air floated if desired. Or hydrated lime may be prepared directly with somewhat more water to produce instead of a completely dry material a material which may have a certain amount of water in it.

It has been found that while hydrated limes may be used in the present process, the results obtained therewith are usually substantially inferior and in most cases very much inferior, to those obtained when using lime preslaked in an excess of water. It has been found that in addition to not obtaining in general so fine a particle size precipitate with the hydrated limes, there usually exists a large proportion of grit and oversize in the final product made therefrom, which proportion is usually much greater than when employing lime preslaked with a substantial excess of water. Moreover, it has been found that with the hydrated limes so far tried, such limes seem to be effective even in their limited capacity to produce fine precipitates, only substantially at the lower temperatures, as they do not appear to give any substantial improvement in fineness at or near the critical temperature. Thus, while in certain cases hydrated lime or hydrated lime containing some moisture may be employed, such lime is not preferred, owing to the inferior product generally produced thereby.

Relative to the sodium carbonate employed, this may be solid soda ash, (if there is provided sufficient water to dissolve it), or a solution thereof, or any material or solution containing sodium carbonate, such as reclaimed soda recovered from spent liquors in the manufacture of pulp. There may be present, also, non-causticizable or partially causticizable constituents in solution, without apparent detriment to the process. Examples of solutions containing such, are solutions such as are causticized in sulphate mills, Keebra process liquors, or the like.

The solutions used preferably should be filtered, settled or the like before use if any solid impurities are present. Carbon particles and the like such as may occur in the liquors to be causticized in soda and sulphate pulp mills if not removed, may show up later as black specks or discoloration in the precipitate.

The effect of heat of solution of solid sodium carbonate, if used, should be taken into consideration when adjusting the reaction temperature.

While the commercial importance of this invention resides chiefly in the use of lime and sodium carbonate, other reacting materials may be used consisting of a causticizing agent and a causticizable or partially causticizable salt, to produce a soluble alkaline hydroxide and a substantially insoluble precipitate of chemical composition corresponding to the acid radicle of the salt or salts used. Examples of causticizing agents are barium or strontium hydroxides, while examples of causticizable salts, which of course in certain cases may be causticizable only in part, are such salts as may be present in or derived from liquors used for digestion or processing in pulp manufacture, and those or other salts when present in substantially pure condition, such as fluorides or sulphates. Normal salts may be used in the present invention or acid salts, such as sodium or potassium bicarbonate, bisulphate and the like.

It will be understood, however, that the claims are not meant to include within their scope the practice, or product thereof, of employing a little barium or strontium oxide or hydroxide for the purpose of removing from a previously causticized liquor the minor remaining percentage of unconverted sodium carbonate which may be present for example in the vicinity of 10 to 15% or thereabout on the combined weight of the sodium hydroxide and sodium carbonate in said liquor.

The term "causticizing agent" is employed in the specification and claims in the sense that it is customarily used with reference to causticizing practice, as conducted, for example, in the alkali industry, chemical pulp industry and the like, to designate a material which will react in the presence of water with a causticizable alkali metal salt to produce an alkali metal hydroxide as one of the reaction products. The term "causticizable salt" as applying for example to an alkali metal salt as used in the specification and claims is intended to include those salts which are either wholly or partially causticizable; the word "causticizable" as referring to a salt such as an alkali metal salt, being employed in the specification and claims in the sense that it is customarily used with reference to causticizing practice, as conducted, for example, in the alkali industry, chemical pulp industry and the like, to designate an alkali metal salt which will react in the presence of water with an agent such as the hydroxide of calcium, strontium or barium, (i. e. a "causticizing agent") to produce an alkali metal hydroxide and a substantially water insoluble material, or at least one substantially insoluble under the conditions of the reaction, said material being of a chemical composition corresponding to the acid radicle of the salt used. The expression "alkali metal" as is well known refers, of course, to the alkali elements, which as may be seen by reference for example to page 28 of Part II of "Outlines of Inorganic Chemistry" by F. A. Gooch and C. F. Walker, The MacMillan Company, N. Y. 1911, consists of the two common ones, the salts of which are in very extensive commercial use, namely, sodium and potassium, together with the three less common ones, namely, lithium, rubidium and caesium.

Relative to proportion of ingredients, the proportion of lime to soda ash should be chosen to give liquors of the desired causticity and preferably to give a precipitate consisting substantially completely of calcium carbonate. If more than one mixing is employed the proportions used in the several mixings should preferably be such that the liquors of the several mixings may be blended to give the desired final liquor. For example, when using two mixings, there may be employed as indicated above 1 part of lime to 1.3 parts soda ash in the first mixing, and .3 part of soda ash in the second mixing. Such proportions yield with a good grade of lime a lime mud substantially free from residual calcium hydroxide and a blended final caustic liquor of substantially 90 per cent. causticity. These proportions are of course merely illustrative as others may be chosen as desired. In some cases a large excess of lime may be used in the first mixing in order to get liquors of high causticity in a short time, and then the carbonation of the lime may be completed in the second mixing by using the proper amount of sodium carbonate. On the other hand, larger amounts of sodium carbonate may be used, if the resultant lower causticity liquor can be utilized, or converted to a higher causticity liquor by the action of further quantity of lime.

In preparing the slaked lime and sodium carbonate solution for use, both may be adjusted to the desired temperature before mixing, or the temperatures may be different providing that, upon mixing, the batch will be at the desired temperature. However, in general the former method is preferred. The apparatus used may be insulated, and equipped with thermostatic control if desired so that the temperature may be maintained at the required point either by admitting steam directly into the reaction vessel or steam or cold water into a jacket surrounding the same, when one is provided. Such refinements, however, have not in general proven to be necessary in carrying out the invention.

Relative to concentration, the concentration of the mix, or the several mixings if used, must be suitably adjusted to give liquors of the desired final concentrations. For example, using the illustrative proportions given in the illustrative example above, the volume in each of the two mixings may be 3800 gallons as stated. This is equivalent to approximately .7 lb. lime originally used per gallon of total volume and produces a liquor in the first mix of about 16° Bé., which may be combined with the liquor from the second mix, to give a total combined liquor of approximately 11°–11½° Bé. at about 90 per cent. causticity as stated. Using the same proportion of ingredients, but carrying out the first mix at a lime concentration of about .47 lb. per gallon of total volume, the liquor from the first mix may be about 9° Bé. and 94 per cent causticity.

The concentration employed appears to have an important bearing on the particle size of the precipitate produced. At the higher concentrations, such as .7 lb. of lime or more per gallon of total reaction mix there is produced in the present invention, as stated, a very finely divided precipitate. When, however, the reaction is carried out at lesser concentrations, such for example as .47 or .18 lb. of lime per gallon, in certain cases the precipitate produced seems to be of such finely divided nature as to possess gelatinous characteristics, and appears to be of a colloidal nature. Precipitates of such nature are of especial value for certain purposes, as is described in detail below.

It will be apparent that the mix or mixings may be carried out at super- or sub-atmospheric pressure but owing to the greater simplicity of the apparatus involved it is preferred to operate at atmospheric pressure.

As briefly referred to above, when the initial temperature of the mix is in the lower ranges there usually appears a transitory thickening of the batch within a very few minutes, which, unless the mix sets to a solid gel, disappears upon continued agitation and does not reappear. At the higher temperatures this effect is not so prominent. This is particularly so when sodium bicarbonate is present as a constituent. When the concentration of the batch is approximately .7 lb. or more of lime per gallon of total volume, in many instances the mass sets to a solid gel in a few minutes when temperatures below approximately 40° C. are employed. The gel may be so firm as to allow agitation only in the small area actually cut out by the agitator. In such an event it is desirable to employ an auxiliary agitator or device to scrape the sides of the reaction vessel in order to break down the gel, which however, may be readily accomplished. After the mix in the gel form is broken down to a slurry, it does not apparently set again into the gel form even though the reaction is continued to completion at the same temperature and at the same rate of agitation as that at which the gel originally formed. As it is sometimes inconvenient to operate with gel formation, a number of methods of overcoming the thickening to a solid gel have been devised, of which several will be mentioned below.

One of these is by the regulation of the temperature. Without changing concentration, agitation, or proportion of ingredients, but by operating above approximately 40° C., solid gel formation is not encountered although a transitory thickening of the batch is noted. Also by adjusting the initial temperature just above the range where gelling takes place, for instance at 40–50° C., the batch may then be allowed to cool down to room temperature, approximately 20° C., and in this manner the initial setting of the batch is overcome. As stated, above, thickening appears to be an initial phenomenon and once the period in which it is likely to occur has passed it need be given no further consideration in adjusting the conditions of the operation.

Without changing the concentration, the temperature or agitation, the lime may be added in stages instead of all at once to overcome setting to a solid gel, but with somewhat lesser efficiency as regards removal of soda salts from the precipitate in the first mixing. Thus, at the start of the reaction only ½ the slaked lime may be added and all the sodium salt, with later addition of the remainder of the slaked lime. The precipitate is of fine particle size substantially characteristic of that producible at the same temperature were all the ingredients to be added at the start. However, although with this procedure substantially all the sodium compound may eventually be removed from the precipitate, considerable washing is necessary. The reverse of this procedure, i. e. adding all the lime and part of the sodium salt, does not appear to be useful in preventing gel formation where it would otherwise occur; on the contrary, it appears to intensify the gelling phenomenon.

Without changing the concentration, temperature or method of addition of ingredients, setting to a solid gel may also be overcome in certain cases by regulating the agitation of the batch carefully, e. g. by mixing the ingredients initially for one or two minutes, then stopping the agitator for a period of ½ to ¾ hour and then resuming the agitation. During this period of non-agitation there may be a transitory thickening of the batch but it does not set to a solid gel. Here again, although the quality of the precipitate is satisfactory, the soda salts, however, are apparently substantially removed only after extensive washing.

By using slower agitation at the start, e. g. just sufficient to keep the solids in suspension, a solid gel will not form in certain cases, but clots of gelatinous material may appear which upon prolonged mixing will disintegrate. However, in this case there is some decrease in the quality of the precipitate, since the particle size is apparently not so fine as that producible with more vigorous agitation.

Without changing the temperature or agitation or using step addition of lime, setting to a solid gel may be overcome by changing the concentration. Thus, instead of operating at a concentration of about .7 pound lime per gallon of total volume, if the operation is conducted at a lower concentration as for example .47 or .18 lb. lime per gallon of total volume and at 20° C., no gelling of the mix is usually encountered. There may appear a transitory thickening which, however, does not result in a solid gel.

Also, apparently in certain cases the gel may be reduced to liquid condition by heating up the gelled mix, say to a temperature of 50° C., preferably with some agitation.

It is characteristic of the precipitates which are produced in the present invention that because of their very slow settling qualities, it is advisable to separate the liquor therefrom, by filter pressing rather than by settling and decantation. However, as will be apparent, by employing apparatus of sufficient size, settling and decantation may be practiced, but it is necessary in such case to use equipment very much larger than that required to produce an equal quantity of caustic liquor by the ordinary causticizing process and, thus, the equipment becomes so costly that filter-pressing is indicated from the standpoint of economy. The washing of the precipitate and handling of liquors may be routed countercurrently in known manner. The whole operation may likewise be carried out in continuous manner while observing the essential features of the process. The precipitate may be used in pulp condition as produced or in liquid suspension, or dried for use as desired.

In certain cases where it is desired to produce the finely divided precipitate of calcium carbonate, but no use exists for the caustic soda concurrently produced, the liquor from the process may be carbonated, as by carbonic acid gas, and reused cyclically in the process.

In certain cases where it is desired to obtain a precipitate of a gelatinous type but where dilute caustic liquors which would ordinarily be produced therewith are unacceptable, the effect of dilution in the reaction may be, with a measure of success, obtained by carrying out the reaction dilute in respect to the lime present rather than in respect both to the total soda salts and lime. For example, a solution containing considerable caustic soda but with only substantially sufficient sodium carbonate to react with a relatively small quantity of lime may be employed to react with such small quantity of lime whereby the concentration of such lime and sodium carbonate in respect to the total volume is relatively low. In certain cases this reaction may be carried out in step fashion, adding successive quantities of ash, all the lime being present at the start if desired, and allowing intermediate time for reaction to take place or even adding lime continuously but slowly, in which case at any given time the concentration of the lime present in respect to the total solution is relatively low. These expedients and other similar ones which will readily occur to one skilled in the art, however, involve certain complications which the straight dilute liquor procedure avoids.

By means of the present invention, there are produced precipitates which are different in characteristics from ordinary lime mud. In the ordinary causticizing process only one coarse-grained lime mud is producible, whereas by the practice of the present invention products of various types may be produced, as for example precipitates of very fine particle size, as well as of such extremely fine size that they partake of gelatinous or colloidal nature. Therefore, there are available extended and diversified uses for such precipitates to which lime mud is not adapted, or only poorly adapted, due to inherent difference in structure and condition.

The precipitates of the present invention may be used in the manufacture of filled paper with excellent results. The type of precipitate used may be chosen according to the character of the paper desired. Thus, where the paper is to have a very high finish the gelatinous precipitates may be used but where not so high a finish is wanted, the non-gelatinous precipitates may be used with satisfaction. In the manufacture of coated paper the different precipitates may be used in order to obtain specific results. Thus, with the use of non-gelatinous precipitates, glossy coated paper may ordinarily be produced with the usual degree of calendering, while with the gelatinous precipitates much higher finishes may be obtained.

It should be noted that in the past in order to use ordinary lime mud successfully as a pigment for coating paper, it was necessary to grind it before use. Likewise such procedure has been found to enhance the quality of filled paper made with lime mud. However, in using the present precipitates no mechanical treatment to reduce or affect the particle size is required before use. However, of course, even these very fine grain precipitates may be subjected to grinding if desired, but this has been found to be unnecessary in practice.

There are a number of other uses for the precipitates herein produced but there have been indicated first the uses in the paper industry because in many cases the precipitate may be produced in a pulp mill in which pulp is produced by an alkaline process such as the soda or sulphate process. Such mill may be connected with a paper mill and the precipitate produced may thereafter be used in the manufacture of coated or filled paper produced at the same mill. Any industrial use where a finely divided pigment is required, and the chemical composition of the precipitate is not a detriment, may be satisfied by the use of the precipitates produced according to the present invention. Examples of such uses are: as fillers in the textile industry, compounding ingredients in the rubber industry, and use in the manufacture of color lakes, printing inks, etc.

Although in general the chemical composition of the product when calcium lime and sodium carbonate are used in the present modified causticizing reaction is considered to be calcium carbonate, yet in many cases, as for example, where colloidal precipitates are produced, there may be some doubt as to the exact chemical and structural composition of the precipitate and therefore where in the claims "calcium carbonate" is used there is meant to be included calcium carbonate or any complex or compound such as would result in the present invention, comprising calcium and carbonate radicles.

The causticizing reaction is an old reaction and consequently as would be expected it has been the subject of considerable study. As has been stated, it has hitherto been the desire in conducting this reaction in the ordinary manner to produce quick settling sludges in order that the caustic soda solution may be easily and quickly decanted therefrom. Thus, although in a general way the usual variables which affect reaction rates and the like have been recognized as possibly applicable to the causticizing reaction, and in certain cases their effect has been noted on the rate of reaction, on settling the precipitate produced, and the like, the motivation of these observations has been the desire to produce quick settling sludges which would favor easy removal of caustic soda therefrom.

Thus, although the desirability of producing fine grain calcium lime sludges was realized, this has hitherto been possible only by mechanical means such as attrition in ball mills, at considerable cost, at the expense of deterioration of the color of the lime mud, and with only a relatively small particle size reduction unless very prolonged grinding was resorted to.

As far as is known, the investigation resulting in the present invention is the first in which variables involved in the causticizing reaction have been studied and determination made thereof from the standpoint of producing fine grain precipitates therein, such precipitates comparable to those hitherto produced only by extremely prolonged grinding of lime sludge and in many cases of much finer character, being even in certain cases colloidal and imparting different characteristics to the paper made therewith. As it has been found as a result of the present investigation that such precipitates can be produced in the causticizing reaction without detriment to the concomitant production of caustic liquor, and at practically no extra expense over the practice of the regular causticizing process, the economic value of the present invention will be apparent.

Thus, this process will greatly facilitate the utilization of the pigment so produced as a filler and/or coating in the paper industry as well as its use in other industries and will, therefore, not only convert an almost worthless product into one of marked utility without the necessity of further mechanical treatment, but will also aid materially in reducing stream pollution which now exists owing to the dumping of these sludges into water ways.

It has previously been proposed to causticize sodium carbonate in the cold by slaking lime in a solution of sodium carbonate and circulating the resultant mix through a special apparatus whereby the reaction speed is greatly accelerated without the customary employment of high temperatures. By carrying out the causticizing reaction in the manner directed in such proposal, a coarse-grained precipitate similar to that obtained in the ordinary process of hot causticizing is produced. There is not produced thereby the fine grain precipitate to the production of which this invention is directed, and for the production of which in cold causticizing it is necessary that the lime be previously slaked in pure water or at least in water which contains only a minor proportion of sodium carbonate.

It has also previously been proposed to produce so-called amorphous calcium carbonate, by which is meant a material whose particles have more or less feather-like edges similar to snow-flakes, or have little spines attached thereto, which result in the interlacing or interlocking of the particles when brought together, but which on the other hand do not contain very fine particles, by bringing together at temperatures up to 200° F., and preferably at that temperature, a mixture of lime and soda ash solution, in which the soda ash solution shall be of special concentration and of which the lime shall be present in an amount considerably lower than the chemical equivalent of the soda ash used, that is, in proportions much less than are commonly employed in commercial causticizing practice. As will be apparent, the present fine grain precipitate does not partake of the characteristics of this so-called "amorphous calcium carbonate" and is not capable of formation at a temperature of 200° F., that is, 93° C., and moreover is not capable of being produced by the slaking of the lime in the soda ash solution whereby as has been stated above a coarse-grained precipitate is produced. However, the particular proportions of lime and soda ash used and the particular concentrations employed in such prior process apparently produce at 200° F. a particular type of coarse-grained precipitate which has the above so-called amorphous characteristics in contradistinction to the ordinary coarse-grained precipitate which has flat surfaces and rounded corners without any quality of coherence, which clearly differentiates it from the fine grain precipitate which is produced by the process disclosed herein.

Where in the claims the expression "calculated in the form originally used" is employed as applying to causticizing agent or lime in defining a concentration, the weight meant to be used in the calculation of said concentration is the weight of the material prior to slaking. For example if lime be the causticizing agent used, the calculation as to concentration is based upon the weight of the calcium as it originally existed in the oxide form (i. e. the weight as CaO).

By the expression "alkaline earth metal" I mean calcium, strontium or barium.

In respect to a reaction in the presence of water involving lime and a material other than a causticizable alkali metal salt, said material being reactive with said lime to produce substantially water insoluble calcium compound, said material being used in sufficient quantity to effect conversion of nearly all, i. e. approximately 90% to 95% or thereabout, or of all of said lime into said substantially water insoluble calcium compound, it is to be understood that the claims are not meant to include within their scope the practice, or product thereof, of including in such reaction in the capacity of a catalyst, intermediate acting or exchange material, or the like, a causticizable alkali metal salt in small percentage, i. e. 10% to 15% or thereabout on the weight of the CaO present in the lime employed, which salt may incidentally produce a substantially correspondingly small amount or less of alkali metal hydroxide by reaction with said lime.

Where the word "pigment" or "sludge" is used in the claims, it is meant to designate the precipitate produced according to the process herein; and where in the claims it is stated that a pigment or sludge is of fine particle size or slow settling or colloidal, or the particles are substantially all of fine size or slow settling or colloidal, this is meant to refer to the great majority of the particles thereof, i. e. the "ultimate particles", and it is not meant thereby to refer to such very small percentage of "oversize" and/or "intermediate" particles as may, under certain conditions, be present in a pigment or sludge when precipitated, such as described in detail in Rafton's copending application, Serial No. 468,985, filed July 18, 1930, now matured into Patent No. 1,934,638, issued Nov. 7, 1933, and which "oversize" and/or "intermediate" particles of course may be later eliminated, by suitable means such for example as described in the above referred to, as well as other prior Rafton patents. And where in the claims the term "very fine" is employed as applying to the size of particle, it is meant to include such fineness of size as that in which the particles approach or are in the colloidal condition.

Where in the claims a pigment or sludge is referred to as being "of very fine particle size" or "slow settling", or as having particles of "very fine size" or "slow settling", it is meant that the particles of said pigment or sludge are of very fine size or slow settling in comparison with the standard-of-reference coarse fast settling particle size precipitates herein referred to produced from similar raw materials under similar conditions of reaction, excepting only that the reaction temperature was substantially above 70° C.

Where in the claims reference is made to conducting an operation "up to" a specified temperature, it is to be understood that the temperature specified is embraced within the range of temperatures contemplated and that the operation referred to may be conducted either at the specified temperature or at a lower temperature down to substantially the freezing point of the mix.

Where in the claims reference is made to conducting an operation "down to and not lower than substantially the freezing point of the mix", it is to be understood that the operation may be conducted at a temperature just above the point at which the mix freezes, or at any temperature thereabove up to and including the temperature limitation set out in the claims.

Where in the claims we use the expression "containing a carbonate group" in referring to an alkali metal salt, we intend that it shall include within its scope bicarbonates as well as carbonates of the alkali metals.

While there has been described in detail the preferred embodiments of the invention, it is to be understood that the details of procedure, the proportions and kinds of ingredients, and the arrangement of steps may be widely varied without departing from the spirit of the invention or the scope of the subjoined claims.

We claim:

1. In the manufacture of pigment conjointly with alkali metal hydroxide by the reaction of a causticizing agent with a causticizable alkali metal salt in the presence of water, the improvement which consists in producing the pigment in the form of slow settling particles of very fine size in conjunction with alkali metal hydroxide in the presence of water by a modification of the causticizing operation comprising reacting upon said causticizable salt with a previously slaked causticizing agent at a temperature up to and not exceeding 70° C., and maintaining the reaction mix at a temperature up to and not exceeding 70° C. during at least a substantial part of the reaction.

2. In the manufacture of pigment conjointly with alkali metal hydroxide by the reaction in the presence of water of a causticizing agent with a causticizable alkali metal salt containing a carbonate group, the improvement which consists in producing the pigment in the form of slow settling particles of very fine size in conjunction with alkali metal hydroxide in the presence of water by a modification of the causticizing operation comprising reacting upon said causticizable salt with a previously produced alkaline earth metal hydroxide at a temperature up to and not exceeding 70° C., and maintaining the reaction mix at a temperature up to and not exceeding 70° C. during at least a substantial part of the reaction, at a pressure not above substantially atmospheric.

3. In the manufacture of pigment conjointly with alkali metal hydroxide by the reaction in the presence of water of a causticizing agent with a causticizable alkali metal salt containing a carbonate group, the improvement which consists in producing the pigment in the form of slow settling particles of very fine size in conjunction with alkali metal hydroxide in the presence of water by a modification of the causticizing operation comprising reacting upon said causticizable salt with previously slaked lime at a temperature up to and not exceeding 70° C., and maintaining the reaction mix at a temperature up to and not exceeding 70° C. during at least a substantial part of the reaction, reactive contact of said causticizable salt with said previously slaked lime being effected by agitation, said lime having been previously slaked with an amount of water at least as great as that required to yield a thick paste.

4. In the manufacture of pigment conjointly with alkali metal hydroxide by the reaction of a causticizing agent with a causticizable alkali metal salt in the presence of water, the improvement which consists in producing the pigment in the form of slow settling particles of very fine size in conjunction with alkali metal hydroxide in the presence of water by a modification of the causticizing operation comprising reacting upon said causticizable salt with previously produced calcium hydroxide at a temperature up to and not exceeding 70° C., and maintaining the reaction mix at a temperature up to and not exceeding 40° C. during at least such part of the reaction as is sufficient to insure the production of said pigment in said form of slow settling particles of very fine size, reactive contact of said alkali metal carbonate with said previously slaked causticizing agent being effected by agitation.

5. In the manufacture of pigment conjointly with alkali metal hydroxide by the reaction of a causticizing agent with an alkali metal carbonate in the presence of water, the improvement which consists in producing the pigment in the form of slow settling particles of very fine size in conjunction with alkali metal hydroxide in the presence of water by a modification of the causticizing operation comprising reacting upon said alkali metal carbonate with a previously slaked causticizing agent at a temperature up to and not exceeding 40° C., and maintaining the reaction mix at a temperature up to and not exceeding 40° C. during at least such part of the reaction as is sufficient to insure the production of said pigment in said form of slow settling particles of very fine size, reactive contact of said alkali metal carbonate with said previously slaked causticizing agent being affected by agitation.

6. In the manufacture of pigment conjointly with sodium hydroxide by the reaction of a causticizing agent with sodium carbonate in the presence of water, the improvement which consists in producing the pigment in the form of slow settling particles of very fine size in conjunction with sodium hydroxide in the presence of water by a modification of the causticizing operation comprising reacting upon said sodium carbonate with a previously slaked causticizing agent at a temperature up to and not exceeding 70° C., and maintaining the reaction mix at a temperature up to and not exceeding 70° C. during at least a substantial part of the reaction, at a pressure not above substantially atmospheric, reactive contact of said sodium carbonate with said previously slaked causticizing agent being effected by agitation, said causticizing agent having been previously slaked with an amount of water at least as great as that required to yield a thick paste.

7. In the manufacture of pigment conjointly with sodium hydroxide by the reaction of a causticizing agent with sodium carbonate in the presence of water, the improvement which consists in producing the pigment in the form of slow settling particles of very fine size in conjunction with sodium hydroxide in the presence of water by a modification of the causticizing operation comprising reacting upon said sodium carbonate with previously slaked lime at a temperature up to and not exceeding 70° C., and maintaining the reaction mix at a temperature up to and not exceeding 70° C. during at least a substantial part of the reaction.

8. In the manufacture of pigment conjointly with alkali metal hydroxide by the reaction in the presence of water of a causticizing agent with a causticizable alkali metal salt containing a carbonate group, the improvement which consists in producing the pigment in the form of slow settling particles of very fine size in conjunction with alkali metal hydroxide in the presence of water by a modification of the causticizing operation comprising reacting upon said causticizable salt with a previously slaked causticizing agent at a temperature up to and not exceeding 65° C., and maintaining the reaction mix at a temperature up to and not exceeding 65° C. during at least a substantial part of the reaction, said causticizing agent having been previously slaked with an amount of water at least as great as that required to yield a thick paste.

9. In the manufacture of pigment conjointly with alkali metal hydroxide by the reaction of a causticizing agent with a causticizable alkali metal salt in the presence of water, the improvement which consists in producing the pigment in the form of slow settling particles of very fine size in conjunction with alkali metal hydroxide in the presence of water by a modification of the causticizing operation comprising reacting upon said causticizable salt with a previously slaked causticizing agent at a temperature up to and not exceeding 60° C., and maintaining the reaction mix at a temperature up to and not exceeding 60° C. during at least such part of the reaction as is sufficient to insure the production of said pigment in said form of slow settling particles of very fine size, at a pressure not above substantially atmospheric, reactive contact of said causticizable salt with said previously slaked causticizing agent being effected by agitation.

10. In the manufacture of pigment conjointly with sodium hydroxide by the reaction of a causticizing agent with sodium carbonate in the presence of water, the improvement which consists in producing the pigment in the form of slow settling particles of very fine size in conjunction with sodium hydroxide in the presence of water by a modification of the causticizing operation comprising reacting upon said sodium carbonate with previously slaked lime at a temperature up to and not exceeding 65° C., and maintaining the reaction mix at a temperature up to and not exceeding 40° C. during at least such part of the reaction as is sufficient to insure the production of said pigment in said form of slow settling particles of very fine size, at a pressure not above substantially atmospheric, said lime having been previously slaked to a mud-like slurry.

11. In the manufacture of pigment conjointly with sodium hydroxide by the reaction of a causticizing agent with sodium carbonate in the presence of water, the improvement which consists in producing the pigment in the form of slow settling particles of very fine size in conjunction with sodium hydroxide in the presence of water by a modification of the causticizing operation comprising reacting upon said sodium carbonate with previously slaked lime at a temperature up to and not exceeding 60° C., and maintaining the reaction mix at a temperature up to and not exceeding 60° C. during at least a substantial part of the reaction.

12. In the manufacture of pigment conjointly with alkali metal hydroxide by the reaction of a causticizing agent with a causticizable alkali metal salt in the presence of water, the improvement which consists in producing the pigment in the form of slow settling particles of very fine size in conjunction with alkali metal hydroxide in the presence of water by a modification of the causticizing operation comprising reacting upon said causticizable salt with a previously slaked causticizing agent at a temperature up to and not exceeding 70° C., maintaining the reaction mix at a temperature up to and not exceeding 70° C. during at least a substantial part of the reaction, and subsequently raising the temperature of the reaction mix above 70° C.

13. In the manufacture of pigment conjointly with alkali metal hydroxide by the reaction in the presence of water of a causticizing agent with a causticizable alkali metal salt containing a carbonate group, the improvement which consists in producing the pigment in the form of slow settling particles of very fine size in conjunction with alkali metal hydroxide in the presence of water by a modification of the causticizing operation comprising reacting upon said causticizable salt with a previously slaked causticizing agent at a temperature up to and not exceeding 40° C., maintaining the reaction mix at a temperature up to and not exceeding 40° C. during at least such part of the reaction as is sufficient to insure the production of said pigment in said form of slow settling particles of very fine size, and subsequently raising the temperature of the reaction mix above 70° C., said causticizing agent having been previously slaked with an amount of water at least as great as that required to yield a thick paste.

14. In the manufacture of pigment conjointly with alkali metal hydroxide by the reaction in the presence of water of a causticizing agent with a causticizable alkali metal salt containing a carbonate group, the improvement which consists in producing the pigment in the form of slow settling particles of very fine size in conjunction with alkali metal hydroxide in the presence of water by a modification of the causticizing operation comprising reacting upon said causticizable salt with a previously slaked causticizing agent at a temperature up to and not exceeding 60° C., maintaining the reaction mix at a temperature up to and not exceeding 60° C. during at least a substantial part of the reaction, and subsequently raising the temperature of the reaction mix above 70° C.

15. In the manufacture of pigment conjointly with alkali metal hydroxide by the reaction in the presence of water of a causticizing agent with a causticizable alkali metal salt containing a carbonate group, the improvement which consists in producing the pigment in the form of slow settling particles of very fine size in conjunction with alkali metal hydroxide in the presence of water by a modification of the causticizing operation comprising reacting upon said causticizable salt with a previously slaked causticizing agent at a temperature up to and not exceeding 50° C., maintaining the reaction mix at a temperature up to and not exceeding 50° C. during at least such part of the reaction as is sufficient to insure the production of said pigment in said form of slow settling particles of very fine size, and subsequently raising the temperature of the reaction mix above 70° C.

16. In the manufacture of pigment conjointly with sodium hydroxide by the reaction of a causticizing agent with sodium carbonate in the presence of water, the improvement which consists in producing the pigment in the form of slow settling particles of very fine size in conjunction with sodium hydroxide in the presence of water by a modification of the causticizing operation comprising reacting upon said sodium carbonate with previously slaked lime at a temperature up to and not exceeding 70° C., maintaining the reaction mix at a temperature up to and not exceeding 70° C. during at least a substantial part of the reaction, and subsequently raising the temperature of the reaction mix above 70° C., said lime having been previously slaked to a mudlike slurry.

17. In the manufacture of pigment conjointly with sodium hydroxide by the reaction of a causticizing agent with sodium carbonate in the presence of water, the improvement which consists in producing the pigment in the form of slow settling particles of very fine size in conjunction with sodium hydroxide in the presence of water by a modification of the causticizing operation comprising reacting upon said sodium carbonate with previously slaked lime at a temperature up to and not exceeding 50° C., maintaining the reaction mix at a temperature up to and not exceeding 50° C. during at least a substantial part of the reaction, and subsequently raising the temperature of the reaction mix above 70° C.

18. The improvement in causticizing practice which consists in producing slow settling pigment of very fine particle size conjointly with alkali metal hydroxide in the presence of water, by effecting causticizing of a causticizable alkali metal salt with a previously slaked causticizing agent in the presence of water at a temperature down to and not lower than substantially the freezing point of the mix and not exceeding the highest at which the gelling phenomenon can occur, with gel formation, and thereafter dispersing the gel formed.

19. In a causticizing process, wherein a plurality of variable operating factors are involved, including temperature, agitation, concentration, and proportion of causticizing agent added at the start of the reaction, the improvement which consists in producing slow settling pigment of very fine particle size conjointly with alkali metal hydroxide in the presence of water, by effecting causticizing of a causticizable alkali metal salt with a previously slaked causticizing agent in the presence of water at a temperature down to and not lower than substantially the freezing point of the mix and not exceeding the highest at which the gelling phenomenon can occur, which temperature, without adjusting any other of said plurality of variable operating factors, would otherwise cause gelling, and substantially preventing such gelling from taking place by adjusting at least one other of said plurality of variable operating factors.

20. In a method of producing slow settling pigment of very fine particle size conjointly with alkali metal hydroxide in the presence of water in a causticizing reaction between a causticizable alkali metal salt containing a carbonate group and a previously slaked causticizing agent conducted at a temperature down to and not lower than substantially the freezing point of the mix and not exceeding the highest at which the gelling phenomenon can occur, wherein agitation of the reaction mix is effected, and wherein a gel would otherwise be formed if vigorous agitation were employed during at least the early stage of the reaction, the step comprising substantially avoiding gelling by limiting the vigor of the agitation during at least the early stage of the reaction.

21. In a method of producing slow settling pigment of very fine particle size conjointly with alkali metal hydroxide in the presence of water in a causticizing reaction between a causticizable alkali metal salt and a previously slaked causticizing agent conducted at a temperature down to and not lower than substantially the freezing point of the mix and not exceeding the highest at which the gelling phenomenon can occur, wherein a gel would otherwise be formed if the concentration of the causticizing agent calculated in the form originally used were substantially .7 pound or more per gallon of total volume of reaction mix, the step comprising substantially avoiding gelling by effecting the reaction at a concentration less than substantially .7 pound causticizing agent calculated in the form originally used per gallon of total volume of reaction mix.

22. In a method of producing slow settling pigment of very fine particle size conjointly with alkali metal hydroxide in the presence of water in a causticizing reaction between a causticizable alkali metal salt containing a carbonate group and a previously slaked causticizing agent conducted at a temperature down to and not lower than substantially the freezing point of the mix and not exceeding the highest at which the gelling phenomenon can occur, wherein a gel would otherwise be formed if the total amount of causticizing agent were added at the start, the steps comprising substantially avoiding gelling by adding less than the total amount of causticizing agent at the start, and subsequently completing the addition of said ingredient.

23. In the manufacture of calcium carbonate conjointly with sodium hydroxide, the improvement which consists in producing the calcium carbonate in the form of slow settling particles of very fine size in conjunction with sodium hydroxide in the presence of water by a modification of the causticizing operation comprising slaking lime in a substantial excess of water, reacting the slaked lime so produced with sodium carbonate in the presence of water at a temperature up to and not exceeding 70° C., maintaining the reaction mix during at least a substantial part of the reaction at a temperature up to and not exceeding 70° C., reactive contact of said sodium carbonate and said slaked lime being effected by agitation, and separating the resultant solution of sodium hydroxide from the precipitate formed.

24. In the manufacture of calcium carbonate conjointly with sodium hydroxide, the improvement which consists in producing the calcium carbonate in the form of slow settling particles of very fine size in conjunction with sodium hydroxide in the presence of water by a modification of the causticizing operation comprising slaking lime in a substantial excess of water, employing vigorous agitation, reacting the slaked lime so produced with sodium carbonate in the presence of water at a temperature up to and not exceeding 70° C., maintaining the reaction mix during at least a substantial part of said reaction at a temperature up to and not exceeding 70° C., separating the resultant solution from the precipitate formed, reacting the precipitate with further quantity of sodium carbonate in the presence of water, and then separating the resultant slow settling very fine particle size calcium carbonate which is substantially free from calcium hydroxide from the associated liquor.

25. In the manufacture of pigment conjointly with alkali metal hydroxide, the improvement which consists in producing the pigment in substantially colloidal form in conjunction with alkali metal hydroxide in the presence of water by a modification of the causticizing operation comprising reacting upon a causticizable alkali metal salt with a previously slaked causticizing agent in the presence of water at a temperature up to and not exceeding 70° C., and maintaining the reaction mix at a temperature up to and not exceeding 70° C. during at least a substantial part of the reaction, the concentration of causticizing agent calculated in the form originally used to total volume of reaction mix being less than substantially .7 pound to the gallon.

26. In the manufacture of calcium carbonate conjointly with sodium hydroxide, the improvement which consists in producing the calcium carbonate in substantially colloidal form in conjunction with sodium hydroxide in the presence of water by a modification of the causticizing operation comprising reacting upon sodium carbonate with previously slaked lime in the presence of water at a temperature up to and not exceeding 70° C., maintaining the reaction mix at a temperature up to and not exceeding 70° C. during at least such part of the reaction as is sufficient to insure the production of said pigment in said substantially colloidal form, the concentration of lime calculated in the form originally used to total volume of reaction mix being less than substantially .7 pound to the gallon.

27. In the manufacture of calcium carbonate conjointly with sodium hydroxide, the improvement which consists in producing the calcium carbonate in substantially colloidal form in conjunction with sodium hydroxide in the presence of water by a modification of the causticizing operation comprising reacting upon sodium carbonate with previously slaked lime in the presence of water at a temperature up to and not exceeding 65° C., and maintaining the reaction mix at a temperature up to and not exceeding 65° C. during at least a substantial part of the reaction, the concentration of lime calculated in the form originally used to total volume of reaction mix being less than substantially .7 pound to the gallon.

28. In the manufacture of calcium carbonate conjointly with sodium hydroxide, the improvement which consists in producing the calcium carbonate in substantially colloidal form in conjunction with sodium hydroxide in the presence of water by a modification of the causticizing operation comprising reacting upon sodium carbonate with previously slaked lime in the presence of water at a temperature up to and not exceeding 60° C., and maintaining the reaction mix at a temperature up to and not exceeding 60° C. during at least a substantial part of the reaction, the concentration of lime calculated in the form originally used to total volume of reaction mix being less than substantially .7 pound to the gallon.

29. The method which consists in producing slow settling pigment of very fine particle size conjointly with sodium hydroxide by a modification of the causticizing operation comprising slaking lime with water in the approximate proportions of 2700 pounds of lime to 1500 gallons of water, mixing the resulting slaked lime with sodium carbonate in the presence of water in such amounts that in proportion of 2700 pounds of lime originally employed the resulting mix will have a total volume of approximately 4000 gallons and contain approximately 5000 pounds of sodium carbonate, conducting the causticizing reaction at a temperature up to and not exceeding 70° C., until the sodium carbonate has been causticized in substantial degree, and subsequently separating the causticized liquor from the sludge.

30. The method which consists in producing slow settling pigment of very fine particle size conjointly with sodium hydroxide by a modification of the causticizing operation comprising slaking lime with water in the approximate proportions of 2700 pounds of lime to 1500 gallons of water, mixing the resulting slaked lime with sodium carbonate in the presence of water in such amounts that in proportion to 2700 pounds of lime originally employed the resulting mix will have a total volume of approximately 4000 gallons and contain approximately 5000 pounds of sodium carbonate, conducting the causticizing reaction at a temperature up to and not exceeding 70° C. until the sodium carbonate has been causticized in substantial degree, raising the temperature of the mix above 70° C., and subsequently separating the causticized liquor from the sludge.

31. The method which consists in producing slow settling pigment of very fine particle size conjointly with sodium hydroxide by a modification of the causticizing operation comprising slaking lime with water in the approximate proportions of 2700 pounds of lime to 1500 gallons of water, mixing the resulting slaked lime with sodium carbonate in the presence of water in such amounts that in proportion to 2700 pounds of lime originally employed the resulting mix will have a total volume of approximately 4000 gallons and contain approximately 5000 pounds of sodium carbonate, conducting the causticizing reaction at a temperature up to and not exceeding 70° C. until the sodium carbonate has been causticized in substantial degree, raising the temperature of the mix above 70° C., separating the causticized liquor from the sludge, subjecting the sludge to further treatment with sodium carbonate in the presence of water substantially completely to carbonate the sludge, and subsequently separating said sludge from the associated liquor.

32. A causticizing sludge thereby characterized that it is the substantially water insoluble reaction product of a previously slaked causticizing agent and a causticizable alkali metal salt, that substantially all the particles thereof are in substantially colloidal condition as precipitated, and that it consists of the substantially water insoluble product of reaction of said reagents carried out, in the presence of water, at least in substantial part at a temperature up to and not exceeding 70° C., and at a concentration less than substantially .7 pound causticizing agent calculated in the form originally used per gallon of total volume of reaction mix, the reaction mix having been maintained at a temperature up to and not exceeding 70° C. during at least a substantial part of the reaction.

33. A causticizing sludge thereby characterized that it is the substantially water insoluble reaction product of a previously slaked lime and a causticizable alkali metal salt containing a carbonate group, that substantially all the particles thereof are slow settling and of very fine size as precipitated, and that it consists of the substantially water insoluble product of reaction of said reagents carried out, in the presence of water, at least in substantial part at a temperature up to and not exceeding 70° C., the reaction mix having been maintained at a temperature up to and not exceeding 70° C. during at least a substantial part of the reaction.

34. A causticizing sludge thereby characterized that it is the substantially water insoluble reaction product of a previously slaked lime and sodium carbonate, that substantially all the particles thereof are slow settling and of very fine size as precipitated, and that it consists of the substantially water insoluble product of reaction of said reagents carried out, in the presence of water, at least in substantial part at a temperature up to and not exceeding 40° C. with agitation and at a pressure not above substantially atmospheric, the reaction mix having been maintained at a temperature up to and not exceeding 40° C. during at least a substantial part of the reaction, said lime having been previously slaked with an amount of water at least as great as that required to yield a thick paste.

ARTHUR MINARD BROOKS.
HAROLD ROBERT RAFTON.

CERTIFICATE OF CORRECTION.

Patent No. 2,062,255.

November 24, 1936

ARTHUR MINARD BROOKS, ET AL.

It is hereby certified that error appears in the printed specification of the above numbered patent requiring correction as follows: Page 2, second column, line 73, for the word "my" read may; page 5, second column, lines 10 and 11, strike out the words and period "This is particularly so when sodium bicarbonate is present as a constituent." and insert the same before "At" in line 8; page 6, second column, line 1, before "ash" insert soda; page 8, second column, line 57, claim 4, for "40° C." read 70° C.; and lines 60, 61 and 62, same claim, strike out the comma and words ", reactive contact of said alkali metal carbonate with said previously slaked causticizing agent being effected by agitation"; page 9, second column, line 16, claim 10, for "40° C." read 65° C.; and that the said Letters Patent should be read with these corrections therein that the same may conform to the record of the case in the Patent Office.

Signed and sealed this 23rd day of February, 1937.

(Seal)

Henry Van Arsdale
Acting Commissioner of Patents.

of lime originally employed the resulting mix will have a total volume of approximately 4000 gallons and contain approximately 5000 pounds of sodium carbonate, conducting the causticizing reaction at a temperature up to and not exceeding 70° C. until the sodium carbonate has been causticized in substantial degree, raising the temperature of the mix above 70° C., separating the causticized liquor from the sludge, subjecting the sludge to further treatment with sodium carbonate in the presence of water substantially completely to carbonate the sludge, and subsequently separating said sludge from the associated liquor.

32. A causticizing sludge thereby characterized that it is the substantially water insoluble reaction product of a previously slaked causticizing agent and a causticizable alkali metal salt, that substantially all the particles thereof are in substantially colloidal condition as precipitated, and that it consists of the substantially water insoluble product of reaction of said reagents carried out, in the presence of water, at least in substantial part at a temperature up to and not exceeding 70° C., and at a concentration less than substantially .7 pound causticizing agent calculated in the form originally used per gallon of total volume of reaction mix, the reaction mix having been maintained at a temperature up to and not exceeding 70° C. during at least a substantial part of the reaction.

33. A causticizing sludge thereby characterized that it is the substantially water insoluble reaction product of a previously slaked lime and a causticizable alkali metal salt containing a carbonate group, that substantially all the particles thereof are slow settling and of very fine size as precipitated, and that it consists of the substantially water insoluble product of reaction of said reagents carried out, in the presence of water, at least in substantial part at a temperature up to and not exceeding 70° C., the reaction mix having been maintained at a temperature up to and not exceeding 70° C. during at least a substantial part of the reaction.

34. A causticizing sludge thereby characterized that it is the substantially water insoluble reaction product of a previously slaked lime and sodium carbonate, that substantially all the particles thereof are slow settling and of very fine size as precipitated, and that it consists of the substantially water insoluble product of reaction of said reagents carried out, in the presence of water, at least in substantial part at a temperature up to and not exceeding 40° C. with agitation and at a pressure not above substantially atmospheric, the reaction mix having been maintained at a temperature up to and not exceeding 40° C. during at least a substantial part of the reaction, said lime having been previously slaked with an amount of water at least as great as that required to yield a thick paste.

ARTHUR MINARD BROOKS.
HAROLD ROBERT RAFTON.

CERTIFICATE OF CORRECTION.

Patent No. 2,062,255.  November 24, 1936

ARTHUR MINARD BROOKS, ET AL.

It is hereby certified that error appears in the printed specification of the above numbered patent requiring correction as follows: Page 2, second column, line 73, for the word "my" read may; page 5, second column, lines 10 and 11, strike out the words and period "This is particularly so when sodium bicarbonate is present as a constituent." and insert the same before "At" in line 8; page 6, second column, line 1, before "ash" insert soda; page 8, second column, line 57, claim 4, for "40° C." read 70° C.; and lines 60, 61 and 62, same claim, strike out the comma and words ", reactive contact of said alkali metal carbonate with said previously slaked causticizing agent being effected by agitation"; page 9, second column, line 16, claim 10, for "40° C." read 65° C.; and that the said Letters Patent should be read with these corrections therein that the same may conform to the record of the case in the Patent Office.

Signed and sealed this 23rd day of February, 1937.

(Seal)

Henry Van Arsdale
Acting Commissioner of Patents.

CERTIFICATE OF CORRECTION.

Patent No. 2,062,255.　　　　　　　　　　　　　　　　　　November 24, 1936.

ARTHUR MINARD BROOKS, ET AL.

It is hereby certified that error appears in the printed specification of the above numbered patent requiring correction as follows: Page 2, second column, line 73, for the word "my" read may; page 5, second column, lines 10 and 11, strike out the words and period "This is particularly so when sodium bicarbonate is present as a constituent." and insert the same before "At" in line 8; page 6, second column, line 1, before "ash" insert soda; page 8, second column, line 57, claim 4, for "40° C." read 70° C.; and lines 60, 61 and 62, same claim, strike out the comma and words ", reactive contact of said alkali metal carbonate with said previously slaked causticizing agent being effected by agitation"; page 9, second column, line 16, claim 10, for "40° C." read 65° C.; and that the said Letters Patent should be read with these corrections therein that the same may conform to the record of the case in the Patent Office.

Signed and sealed this 23rd day of February, 1937.

(Seal)　　　　　　　　　　　　　　　　　　　　　　　　　　Henry Van Arsdale
　　　　　　　　　　　　　　　　　　　　　　　　Acting Commissioner of Patents.